Apr. 10, 1923.
W. E. DUNSTON
1,451,497
PIVOTAL CLAMPING DEVICE FOR BUMPERS AND THE LIKE
Filed Dec. 16, 1922
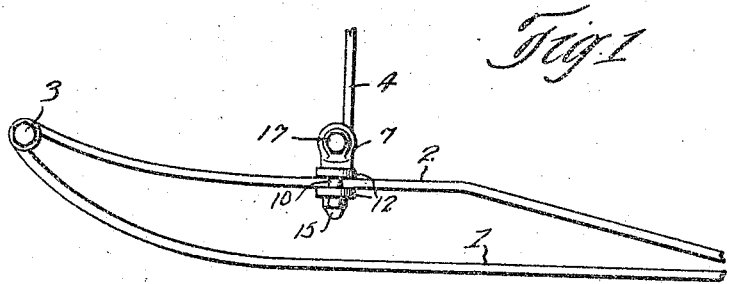
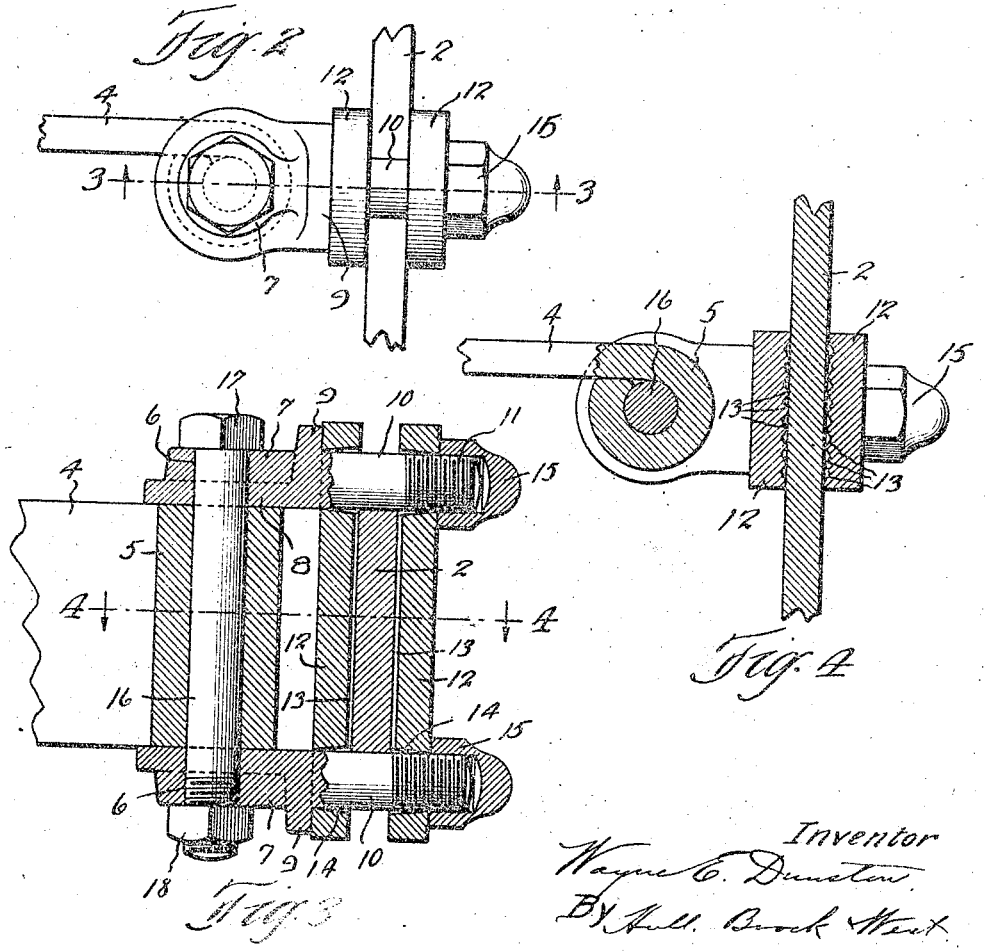
Inventor
Wayne E. Dunston.
By Hull, Brock West
Attys.

Patented Apr. 10, 1923.

1,451,497

UNITED STATES PATENT OFFICE.

WAYNE E. DUNSTON, OF KALAMAZOO, MICHIGAN, ASSIGNOR TO CHRISTIAN GIRL, OF KALAMAZOO, MICHIGAN.

PIVOTAL CLAMPING DEVICE FOR BUMPERS AND THE LIKE.

Application filed December 16, 1922. Serial No. 607,276.

*To all whom it may concern:*

Be it known that I, WAYNE E. DUNSTON, a citizen of the United States, residing at Kalamazoo, in the county of Kalamazoo, and State of Michigan, have invented a certain new and useful Improvement in Pivotal Clamping Devices for Bumpers and the like, of which the following is a full, clear, and exact description, reference being had to the accompanying drawings.

This invention relates to means for clamping and pivotally supporting various objects and, as shown herein, is especially adapted for the purpose of clamping and pivotally supporting bumpers for automobiles. It is the general object and purpose of the invention to provide simple, efficient, and sightly clamping and pivoting means for objects of the nature mentioned. I accomplish these objects in and through the construction and arrangement of parts shown in the accompanying drawings, wherein Fig. 1 represents a plan view of a portion of a bumper and a portion of one of its supporting arms, illustrating the manner in which my invention is employed therewith; Fig. 2 is an enlarged detail in plan view of the clamping and pivoting device and its connections; Fig. 3 a sectional detail corresponding to the line 3—3 of Fig. 2; and Fig. 4 a similar detail corresponding to the line 4—4 of Fig. 3.

Describing by reference characters the various parts illustrated herein, 1 represents the front or impact bar and 2 the rear or auxiliary bar of a bumper, the second bar being connected at its ends to the ends of the first-mentioned bar, as by means of bolts, one of which is indicated at 3. The bumper may be of any standard or approved construction; for instance, such as shown in the patent to Allan L. McGregor, No. 1,372,154 issued March 22, 1921. The rear or auxiliary bar 2 is preferably a flat metal plate, such as is employed in the manufacture of vehicle springs, whereby its opposite faces afford bearing surfaces for the clamping members of the devices by which the bumper is pivotally connected to its supporting arms; the outer end of one of said arms is indicated at 4, the inner ends of the arms being connected in any suitable manner to the corresponding side frame members of an automobile (not shown). The supporting arm 4 is shown also in the form of a flat spring plate, having at its front or outer end an eye 5. The width of the arm 4 will preferably be substantially the same as the width of the plate or bar 2.

The means for pivotally supporting the bumper from each of the arms 4 comprises a pair of clamping plates and a pair of special eye bolts for each arm, together with a bolt adapted to extend through the eyes of said bolts and through the eye 5. The eye bolts are preferably identical in construction, whereby they are interchangeable; so also are the clamping plates. Each eye bolt is provided at its inner or rear end with a bore 6 within a nut or head seat 7 and with a flat bearing face 8 adapted to engage an end of the eye 5. In addition, each bolt is provided with a transversely extending shoulder 9, adapted to form a stop for one of the clamping members, and with a bolt stem 10 extending from such shoulder and having its end threaded, as indicated at 11.

12 denotes each of the clamping plates, the said plates being identical in construction and provided each with a face having vertical ribs 13 thereon adapted to engage the adjacent face of the bar or plate 2 and each having, above and below such ribbed plate-engaging portion, a bore 14 adapted to receive the stem 10 of the corresponding eye bolt. The clamping plates are forced into binding engagement with the opposite faces of the bar or plate 2 by means of nuts 15, which are shown as of the ornamental acorn type.

Each end portion of the bar or plate 2 is mounted between the said bolts and the clamping plates 2. The stop 9 on each of said bolts is adapted to be engaged by one of said clamping plates while the nuts on said bolts are adapted to engage the opposite clamping plate.

The assembly of the eye bolts and clamping plates is then pivotally supported from the end of the corresponding arm 4 by means of a bolt 16 having its head 7 engaging the bearing surface 7 of one eye bolt and the nut 18 engaging the like surface of the other eye bolt.

Having thus described my invention, what I claim is:

1. The combination, with a supporting member having an eye, of means for clamping and pivotally supporting a bar or plate from said eye, said means comprising a pair of eye bolts, a bolt extending through the eyes of said bolts and through the eye on said supporting member and pivotally connecting the eye bolts thereto, each eye bolt having a stem and a stop, clamping plates mounted on the stems of said bolts on opposite sides of said bar or plate and each having projections adapted to bear against the adjacent face of said bar or plate, and nuts on the threaded ends of said eye bolts.

2. The combination, with a supporting member having an eye, of means for clamping and pivotally supporting a bar or plate from said eye, said means comprising a pair of eye bolts, a bolt extending through the eyes of said bolts and through the eye on said supporting member and pivotally connecting the eye bolts thereto, each eye bolt having a stem and a stop, clamping members mounted on the stems of said bolts on opposite sides of said bar or plate, and nuts on the threaded ends of said eye bolts.

3. The combination, with a supporting member having an eye, of means for clamping a bar or plate and for pivotally supporting it from said eye, said means comprising a pair of eye bolts each having a face adapted to engage an end of the first mentioned eye and a seat for a bolt head or nut surrounding its eye, each eye bolt also having a threaded stem and a shoulder operatively interposed between said stem and the eye thereof, and a pair of clamping plates each having apertures therein for said eye bolts and adapted to be applied to said bolts and to opposite sides of said bar or plate, and nuts for the threaded ends of said eye bolts.

4. The combination with a supporting member having an eye at the end thereof, of combined means for clamping a bar or plate and for pivotally supporting it from said eye, said means comprising a pair of symmetrical members each adapted to receive a bolt extending through said eye whereby the said members may be pivotally connected to said eye, the said members being adapted to extend above and below said bar or plate respectively and in substantial engagement with the top and bottom of said bar or plate, and clamping means mounted upon the said members.

5. The combination, with a supporting member having an eye at the end thereof, of means for clamping a bar or plate and for pivotally supporting it from said eye, the said means comprising a pair of members each having an eye or opening therethrough for the reception of a bolt for pivotally connecting the same to the first mentioned eye, each of said members having a stop and a threaded stem projecting beyond said stop, a clamping device mounted upon said stems and adapted to engage the outer face of said bar or plate, and nuts on said stems for forcing the said clamping device against the said bar or plate and the said bar or plate toward the said stops.

In testimony whereof, I hereunto affix my signature.

WAYNE E. DUNSTON.